Nov. 24, 1953 H. N. MAGIDA Re. 23,744

PUSH AND PULL FRICTION TYPE EXERCISER

Original Filed March 27, 1948 2 Sheets-Sheet 1

Inventor
Herbert N. Magida
BY Edward W. Wiener
Attorney.

PUSH AND PULL FRICTION TYPE EXERCISER

Original Filed March 27, 1948 2 Sheets-Sheet 2

Inventor
Herbert N. Magida
BY Edward W. Weinert
Attorney.

Reissued Nov. 24, 1953 Re. 23,744

UNITED STATES PATENT OFFICE 23,744

PUSH AND PULL FRICTION TYPE EXERCISER

Herbert N. Magida, Chicago, Ill.

Original No. 2,543,729, dated February 27, 1951, Serial No. 17,567, March 27, 1948. Application for reissue February 5, 1953, Serial No. 335,408

12 Claims. (Cl. 272—79)

Figure 1:
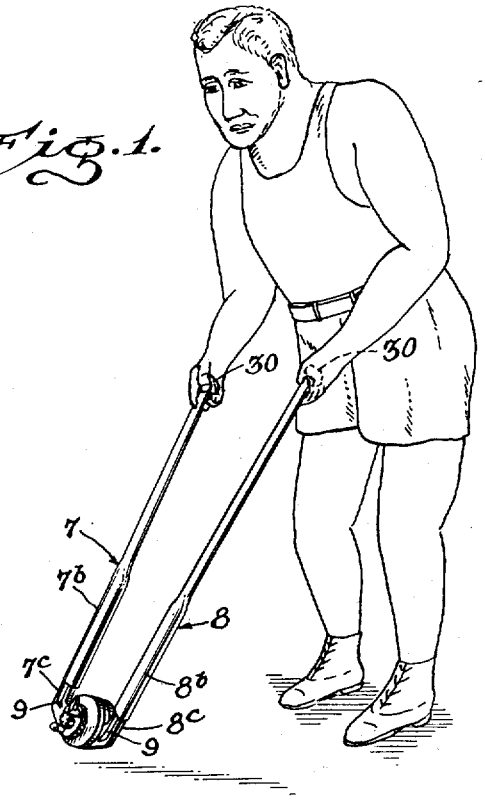

Matter enclosed in heavy brackets [ ] appears in the original patent but forms no part of this reissue specification; matter printed in italics indicates the additions made by reissue.

This invention relates to an exercising device for use in gymnasiums, or homes or the like and concerns itself with a structure comprising a pair of arms pivoted together at one end by means of friction disks which can be adjusted to vary the resisting friction and in which the device is free to be swung as desired.

In the past attempts have been made to use springs for the resistance in such devices but it was difficult to properly regulate the tension of the springs which would tend to lose their tension during use. Further, the tension of a particular spring would not be likely to meet the needs of different individuals. Attempts have also been made to use friction slide bars in such devices but they provided only a limited range of benefit. In instances where friction arms have been anchored to stationary structures, there has *been* also an undue limitation upon the range of beneficial effect arising from the limited range of exercise that such a device affords.

It is an object of this invention to provide an exercising device which will overcome the short comings of prior devices as above pointed out; a device which is free to be moved in any direction when in use to provide a larger range of beneficial effect and in which the frictional resistance can be easily varied without the use of tools to meet the strength or requirements of any individual.

It is also an object of this invention to provide such an exercising device in which the friction adjusting means can be securely locked in adjusted postion so that there is no liability of the same working loose during use.

With these and other objects in view which will become apparent as the description proceeds, this invention comprises the novel structure and combination of parts hereinafter described and more particularly pointed out and defined in the appended claims.

Figure 3:
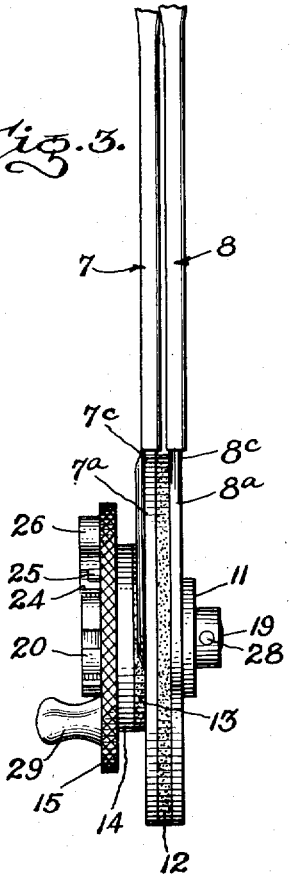
Figure 2:
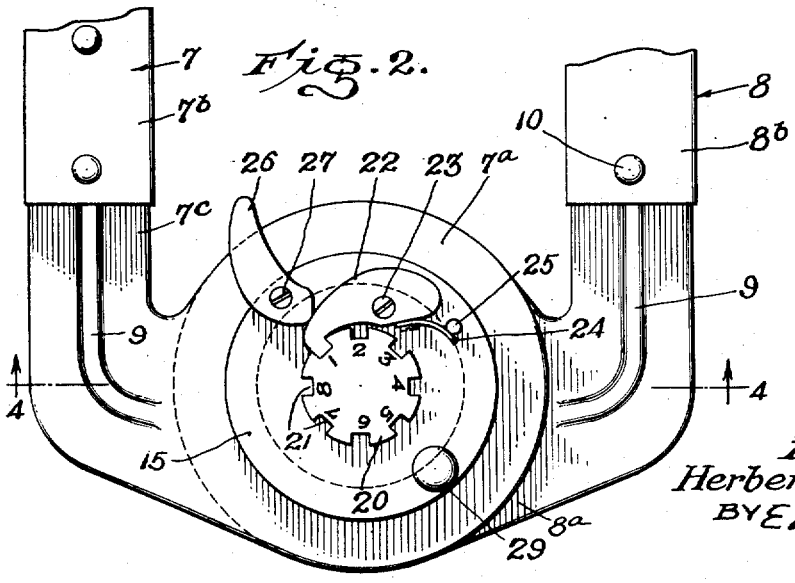
Figures 4, 5:
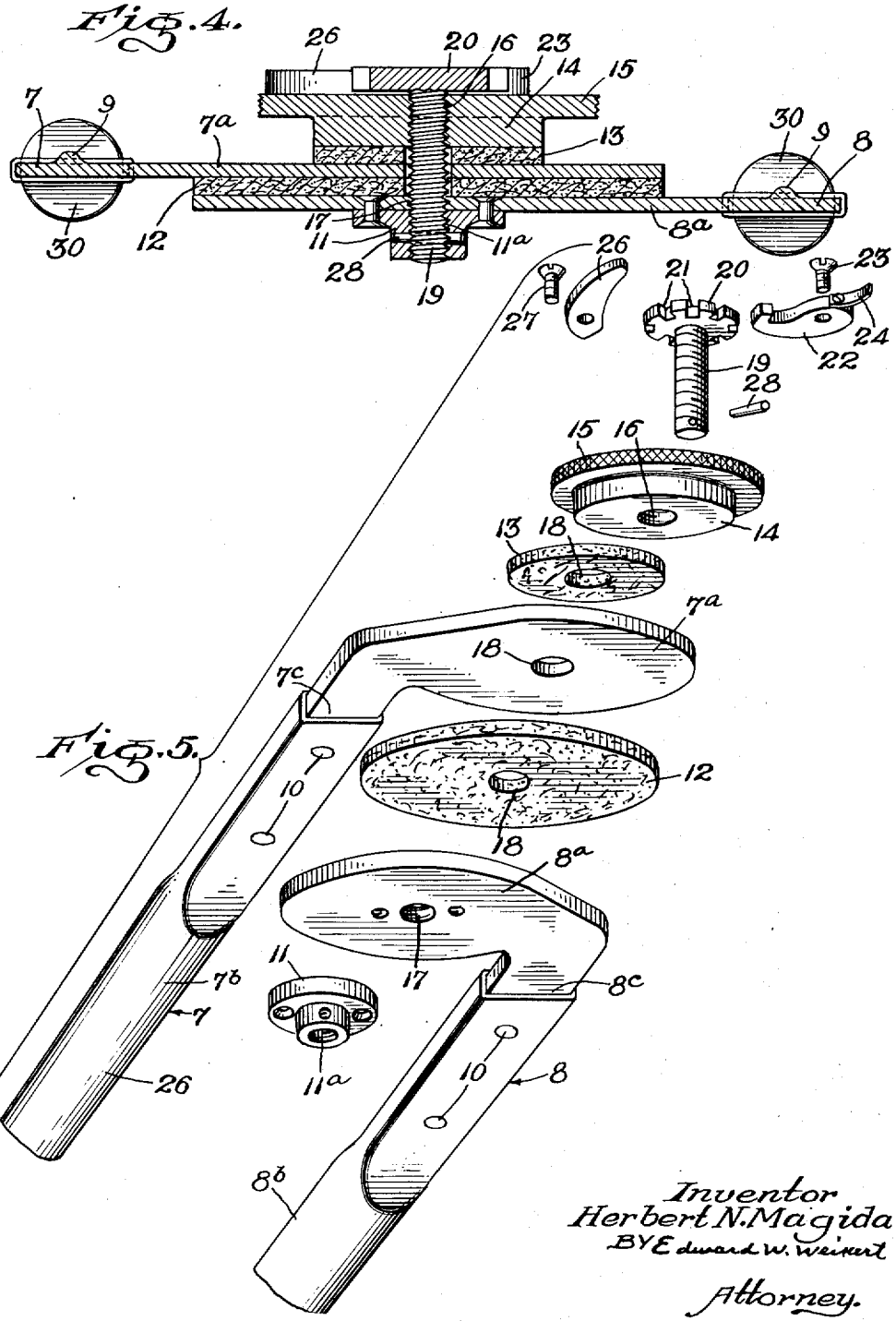

In the accompanying drawing which illustrates a preferred form of this invention and in which similar reference numerals refer to similar features in the different views:

Fig. 1 is a perspective view of an exercising device involving this invention in the hands of a user illustrating the manner in which it can be used, Fig. 2 is a fragmentary and enlarged elevational view of the friction joint, Fig. 3 is an enlarged edge elevational view of the device, Fig. 4 is an enlarged sectional view taken upon the line 4—4 of Fig. 2 looking in the direction of the arrows; and Fig. 5 is a perspective view of the friction joint in disassembled relation.

In referring now to the drawing, it will be observed that the illustrated embodiment of this invention comprises two arms 7 and 8 connected by a friction joint. The arm 7 terminates at its outer end in a friction disk 7a which is flat and extends at substantially right angles to the arm. The arm 8 likewise terminates in a flat friction disk 8a at its outer end which extends at substantially right angles to the arm proper.

In the illustrated embodiment of the invention, the arms are not shown as integral structures. Each consists of two parts; the handle parts being hollow and enlarged and in telescopic relation with shanks on the disks. Thus the handle portion 7b of the arm 7 is enlarged and telescoped at its lower portion over a shank 7c on the disk 7a. The arm 8 is likewise enlarged at its lower end and telescoped over a flat shank 8c on the disk 8a. The flat sides of the shanks 7c and 8c are preferably reinforced by strengthening ribs 9. The handle portions of the arms may be attached to the shanks by rivets 10 or in any other suitable manner.

An internally threaded hub 11 is secured to the center of the disk 8a in any suitable manner. A friction disk 12 is positioned between the disks 7a and 8a. A smaller friction disk 13 is positioned adjacent the outer surface of the disk 7a and a disk 14 having an enlarged knurled rim portion 15 is positioned against the friction disk 13. The disk 14 is provided with a central threaded aperture 16. The hub 11 has a threaded aperture 11a and the disk 8a has a threaded aperture 17. The disk 7a and the adjacent friction disks have smooth apertures 18 which are slightly larger than the threaded apertures in the other disks.

The disks 7a, 8a, 12, 13 and 14 are held in tight engagement by a screw 19 having a head 20 with right angled notches 21 in spaced relation for receiving a locking pawl 22 which is pivoted to the outer surface of the disk 14. A leaf spring 24 (Fig. 2) is attached to the under surface of the pawl and the free end thereof is confined under a stud 25 on the disk 14. This spring tends to hold the pawl in engagement with the head of the screw bolt 19. But to insure locking the pawl 22 in engagement with the head of the screw bolt, a locking cam 26 is pivoted to the disk 14 as indicated at 27 adjacent the forward end of the pawl when the same is in its locking position. In Fig. 2, the cam is shown in pawl locking position. By swinging the cam on its pivot it can be moved to unlocking position as is obvious.

The screw bolt 19 is in threaded relation with the disk 14, the disk 8a and the hub 11. A pin 28 extends thru the hub and screw bolt 19 and normally prevents relative rotation between the screw bolt and the hub 11 with its attached disk 8a. Thus it will be apparent that the screw bolt 19 is locked to the disk 8a and the disk 14 with the result that the arm 8 with its disk 8a and disk 14 will rotate as a unit.

The friction joint is adapted to be adjusted to increase or decrease the frictional resistance by rotating the disk 14 which is provided with a hand knob 29 for such a purpose. However, before an adjustment can be made, it is necessary to unlock the said disk 14 from the head of the bolt by disengaging the pawl 22. After the adjustment has been made, the pawl will again be moved to locking position and engaged by the locking cam 26.

In use, the user seizes the ends of the handles 7 and 8 which may be provided with suitable hand knobs 30 for such a purpose. The handles are adapted to be oscillated.

In exercising, the arms may be spread apart as far as desired and brought together against the resistance of the friction disks; at the same time the device may be raised or lowered as a whole or swung in various directions to bring a wide range of muscles into action. If the friction should be too great or not sufficient, the user can quickly remedy this himself without the use of tools by merely unlocking the pawl and rotating the disk 14 in the proper direction; then moving the pawl again to locking position as previously set forth.

It will be appreciated that the exercising device involving this invention can be used by a class in a gymnasium or in the home or in most any place and that it can be used to provide a wide range of beneficial effect due to the fact that it can be freely moved or swung when in use.

I am aware that many changes may be made and various details of construction may be modified without departing from the principles of this invention so I do not propose limiting the patent granted thereon otherwise than necessitated by the appended claims.

I claim:

[1. In an exercising device, a pair of arms having disks at one end, a friction disk between said disks, a second friction disk positioned against the outer surface of one of said first mentioned disks, a rotatable adjustable disk positioned against said second friction disk, a screw bolt connecting said disks and having threaded relation with said rotatable disk, means for fixedly anchoring said screw bolt to the outer of said first mentioned disks and means for releasably locking said bolt to said rotatable disk for normally preventing relative rotation thereof.]

2. In an exercising device of the class described, a pair of arms having flat disks at one end, said disks [extending] *being offset inwardly* substantially at right angles to the axis of said arms and in spaced relation, a friction disk between said pair of disks, a second friction disk positioned against the outer face of one of said first mentioned disks, a rotatable and adjustable disk positioned against said second friction disk, a screw bolt connecting all of said disks and having threaded relation with said rotatable disk *about an axis offset inwardly from said arms*, means for fixedly securing said bolt to the outer disk of said pair for preventing relative rotation thereof and means for releasably locking said bolt to said rotatable disk for causing conjoint rotation thereof.

[3. In an exercising device of the class described, a pair of arms having disks at one end in spaced relation, a friction disk between said disks, a second friction disk positioned against the outer face of one of said pair of first mentioned disks, a rotatable disk positioned against said second friction disk, a screw bolt connecting all of said disks and having threaded relation with said rotatable disks, coacting means on said bolt and rotatable disk for releasably locking the same together and means for fixing said bolt to a first mentioned disk.]

4. In an exercising device of the class described, a pair of arms having disks at one end [extending] *offset inwardly* at substantially [at] right angles to the axis of said arms and in slightly spaced relation, a friction disk between said disks, a second friction disk adjacent the outer face of one of said first mentioned disks, a rotatably adjustable disk adjacent the outer face of said second friction disk, a screw bolt *having an axis offset inwardly of said arms and* having a notched head connecting all of said disks with the notched head positioned against the outer face of said rotatable member, a pawl pivoted on said rotatably adjustable disk for engaging said notches for locking said bolt to said disk, means for locking said pawl in locking position and means for fixedly connecting the tail end of said bolt to the outside disk of those first mentioned to cause such disk, bolt and adjustable disk to move as a unit.

5. In an exercising device of the class described, a pair of arms pivotally connected at one end by a friction joint free to move in any direction, each arm having a disk at one end [extending] *offset inwardly* at right angles thereto with a friction disk between said disks, a second friction disk adjacent the outer face of one of said first mentioned disks, an adjustable disk adjacent the outer face of said second disk, means for connecting all of said disks comprising a member releasably connected to said adjustable disk and fixedly connected to the outer disk of the first mentioned disks, said means having a threaded relation with said adjustable disk.

6. In an exercising device, a pair of *relatively movable* arms having disks at adjacent ends, a flat friction disk between said disks, a second flat friction disk adjacent the outer face of one of said first mentioned disks, a rotatable and adjustable disk positioned against the outer surface of said second frictional disk, a screw bolt extending thru said disks and having a threaded relation with said rotatable disk, said bolt having a [notched] head *with circumferentially spaced notches* adjacent the the outer face of said rotatable disk, a latch on the outer face of said rotatable disk for locking engagement with *the notches of* said notched head *whereby the pressure between said disks may be adjusted in definite predetermined incremental amounts*, and means for anchoring the unheaded end of said bolt to the outside disk of the pair of first mentioned disks.

7. In an exercising device, a pair of *relatively movable* exercising arms having disks at adjacent ends, a flat friction disk between said disks and in frictional contact therewith, a second flat frictional disk in contact with the outer face of one of said first mentioned disks, a rotatable hand operated disk positioned against the outer surface of said second mentioned frictional disk, a bolt extending thru all of said disks and having a threaded relation with said hand operated disk, said bolt having a [notched] head *with circumferentially spaced notches* adjacent the outer surface of said hand operated disk, a latch upon the outer face of said hand operated disk for locking engagement with *the notches of* said notched head *whereby the pressure between said disks may be adjusted in definite predetermined incremental amounts,* a cam upon the outer face of said hand operated disk for locking said latch in operative position and means for anchoring the unheaded end of said bolt to the outside disk of the pair of first mentioned disks.

*8. An exercising device having a pair of elongated operating arms adapted to be respectively grasped for operation by the hands of an operator and having respective disks rigidly secured at one end thereof, a friction disk between said arm disks for frictionally engaging said arm disks, a pivot pin extending through said arm and friction disks and means for varying the pressure between said disks to vary the force required to move said arms relative to one another about said pivot pin, said entire device being sufficiently light in weight to be freely movable by hand in any direction as a unit when in use, said elongated operating arms being many times longer than the diameter of said disks whereby the ends of said arms opposite the ends carrying said disks may be moved relative to one another along an arc of appreciable radius having its center coextensive with the longitudinal axis of said pivot pin, and said operating arms being restrained by said pivot pin from relative movement about axes other than said axis.*

*9. A free-swinging exercising device comprising a pair of elongated operating arms adapted to be respectively grasped for operation by the hands of an operator and having disks rigidly secured at one end, a friction disk between said disks, a pivot bolt extending through said disks, said elongated operating arms being many times longer than the diameter of said disks whereby the ends of said arms opposite the ends carrying said disks may be moved relative to one another along an arc of appreciable radius having its center coextensive with the longitudinal axis of said pivot bolt, said operating arms being restrained by said pivot bolt from relative movement about axes other than said axis, an adjustable nut upon said bolt for varying the friction between said disks and means for preventing loosening of said nut by movement of one arm relative to the other arm, said entire device being sufficiently light in weight to be freely movable as a unit by hand in any direction when in use.*

*10. A free-swinging exercising device comprising a pair of arms adapted to be respectively grasped for operation by the hands of an operator and having respective disks at one end offset inwardly laterally from said arms, a friction disk between said latter disks, apertures in said disks offset inwardly from said arms, a pin passing through the apertures in all of said disks about which said arms and attached disks may pivot and means for compressing all of said disks together whereby an appreciable amount of force is necessary to separate said arms.*

*11. In an exercising device, a pair of elongated operating arms having disks rigidly secured at one end, a friction disk between said disks, a rotatable adjustable disk overlying the outer face of one of said arm disks, a screw bolt connecting*

*said disks and in threaded relation with said rotatable adjustable disk, said elongated operating arms being many times longer than the diameter of said disks whereby the ends of said arms opposite the ends carrying said disks may be moved relative to one another along an arc of appreciable radius having its center coextensive with the longitudinal axis of said screw bolt, said operating arms being restrained by said screw bolt from relative movement about axes other than said axis, and means for fixedly anchoring said screw bolt to one of said arm disks for preventing relative rotation therebetween.*

*12. In an exercising device of the class described, a pair of elongated operating arms pivotally connected at one end by a friction joint, each arm having a disk rigidly secured at one end with a friction disk between said disks, an adjustable disk overlying the outer face of one of said arm disks, a pivot pin extending through all of said disks having a threaded portion, said elongated operating arms being many times longer than the diameter of said disks whereby the ends of said arms opposite the ends carrying said disks may be moved relative to one another along an arc of appreciable radius having its center coextensive with the longitudinal axis of said pin, said operating arms being restrained by said pivot pin from relative movement about axes other than said axis, said adjustable disk threaded to said threaded portion of said pivot pin for providing a means for adjusting the pressure between said disks to vary the force required to separate said arms, said entire device being sufficiently light in weight to be freely movable as a unit by hand in any direction when in use.*

*13. In an exercising device, a pair of exercising arms having disks at adjacent ends, a flat friction disk between said disks for making frictional contact therewith, a rotatable hand operated disk overlying the outer face of one of said arm disks, a bolt extending through all of said disks and being in threaded relation with said hand operated disk, said bolt having a head with circumferentially spaced notches and positioned on the outer surface of said hand operated disk, a latch upon the outer face of said hand operated disk for making locking engagement with the notches of said notched head whereby the pressure between said disks may be adjusted in definite predetermined incremental amounts, and means for anchoring the unheaded end of said bolt to said other arm disk.*

*14. An exercising device having a pair of elongated operating arms which are enlarged at one end to provide confronting friction making surfaces of appreciable area which are integral with said operating arms, means pivotally supporting said arms for relative rotation with respect to each other about an axis extending laterally through said enlarged arm ends thereof, said arms being restrained by said means from relative rotation about other axes, said elongated operating arms being many times longer than the outer dimension of said enlarged arm ends whereby the ends of said arms opposite said enlarged ends may be moved relative to one another along an arc of appreciable radius, adjustable means for compressing said enlarged ends toward one another to vary the force required to pivot said arms relative to each other, said entire device being sufficiently light in weight to be freely*

*movable as a unit by hand in any direction when in use.*

HERBERT N. MAGIDA.

References Cited in the file of this patent or the original patent

UNITED STATES PATENTS

| Number | Name | Date |
|---|---|---|
| 1,727,657 | Martin | Sept. 10, 1929 |
| 2,252,868 | Senn | Aug. 19, 1941 |
| 2,470,215 | Graham | May 17, 1949 |
| 2,529,347 | Mahler et al. | Nov. 7, 1950 |

FOREIGN PATENTS

| Country | Number | Date |
|---|---|---|
| France | 577,971 | Sept. 13, 1924 |